US010410142B1

(12) United States Patent
Hess et al.

(10) Patent No.: US 10,410,142 B1
(45) Date of Patent: Sep. 10, 2019

(54) INTEGRATED RISK ANALYSIS MANAGEMENT

(71) Applicant: United Services Automobile Association (USAA), San Antonio, TX (US)

(72) Inventors: Alissa Hess, Boerne, TX (US); Debra Freund, Fair Oaks Ranch, TX (US); Dustin Bishop, San Antonio, TX (US); James Edwin Knighton, Bulverde, TX (US); Jared Alan Natho, San Antonio, TX (US); Michael Black, San Antonio, TX (US); Brian Philip Stackhouse, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 939 days.

(21) Appl. No.: 14/270,532

(22) Filed: May 6, 2014

(51) Int. Cl.
*G06Q 10/00* (2012.01)

(52) U.S. Cl.
CPC .................................... *G06Q 10/00* (2013.01)

(58) Field of Classification Search
CPC ........................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 6,317,727 B1 * | 11/2001 | May | G06Q 30/08 | 705/36 R |
| 7,305,351 B1 * | 12/2007 | Bechhofer | G06Q 10/0635 | 705/7.28 |
| 7,389,211 B2 * | 6/2008 | Abu El Ata | G06F 17/10 | 703/2 |
| 7,444,307 B2 * | 10/2008 | Heires | G06Q 10/06 | 705/400 |
| 7,552,480 B1 * | 6/2009 | Voss | G06F 21/577 | 380/277 |
| 7,737,914 B2 * | 6/2010 | Patel | G06Q 20/04 | 345/2.3 |
| 7,895,102 B1 * | 2/2011 | Wilks | G06Q 30/06 | 235/379 |
| 7,962,960 B2 * | 6/2011 | Fudge | G06F 11/008 | 726/25 |
| 8,589,273 B2 * | 11/2013 | Creeden | G06Q 40/08 | 705/35 |
| 8,620,785 B1 * | 12/2013 | Wilks | G06Q 90/00 | 705/35 |
| 2003/0009475 A1 * | 1/2003 | Kayamoto | G06F 16/217 | |

(Continued)

*Primary Examiner* — Alan S Miller
(74) *Attorney, Agent, or Firm* — Fish & Richardson P.C.

(57) ABSTRACT

Computer-implemented methods include: receiving, in a first client device, multiple risk indicators from multiple server devices over a network, in which the multiple risk indicators represent different external risks to a business and different internal risks to two or more divisions of the business; applying a forecasting model to at least one risk indicators to obtain one or more estimated future performance metrics; outputting to a graphical user interface, at least one of the estimated future performance metrics, the external risks or the internal risks; and outputting to the graphical user interface, a user-interactive feature for sending at least one of the estimated future performance metrics, the external risks, or the internal risks from the first client device, over the network, to a second client device.

12 Claims, 9 Drawing Sheets

(56) References Cited

U.S. PATENT DOCUMENTS

2003/0093347 A1* 5/2003 Gray ..................... G06Q 40/00 705/35
2003/0154144 A1* 8/2003 Pokorny ........... G05B 13/0285 705/28
2003/0182212 A1* 9/2003 Moscone .............. G06Q 10/10 705/30
2004/0249482 A1* 12/2004 Abu El Ata ........... G06F 17/10 700/44
2005/0222892 A1* 10/2005 Sutherland ......... G06Q 10/0635 705/7.28
2006/0036536 A1* 2/2006 Williams .............. G06Q 10/10 705/38
2006/0177058 A1* 8/2006 Sarwono ............ H04L 12/1895 380/211
2006/0195905 A1* 8/2006 Fudge .................. G06F 11/008 726/25
2007/0174330 A1* 7/2007 Fox ....................... G06Q 10/10
2007/0208600 A1* 9/2007 Babus ................... G06Q 10/04 705/7.28
2007/0219837 A1* 9/2007 Lu ..................... G06Q 10/0635 705/7.28
2007/0233594 A1* 10/2007 Nafeh ................... G06Q 40/00 705/37
2008/0140514 A1* 6/2008 Stenger ................. G06Q 10/06 705/7.28
2009/0030751 A1* 1/2009 Barve ................... G06Q 10/04 705/7.22
2012/0004946 A1* 1/2012 Blackwood ........... G06Q 10/06 705/7.28
2012/0095802 A1* 4/2012 Wilberding .......... G06Q 10/063 705/7.28
2013/0060603 A1* 3/2013 Wagner ................. G06Q 40/12 705/7.29

* cited by examiner

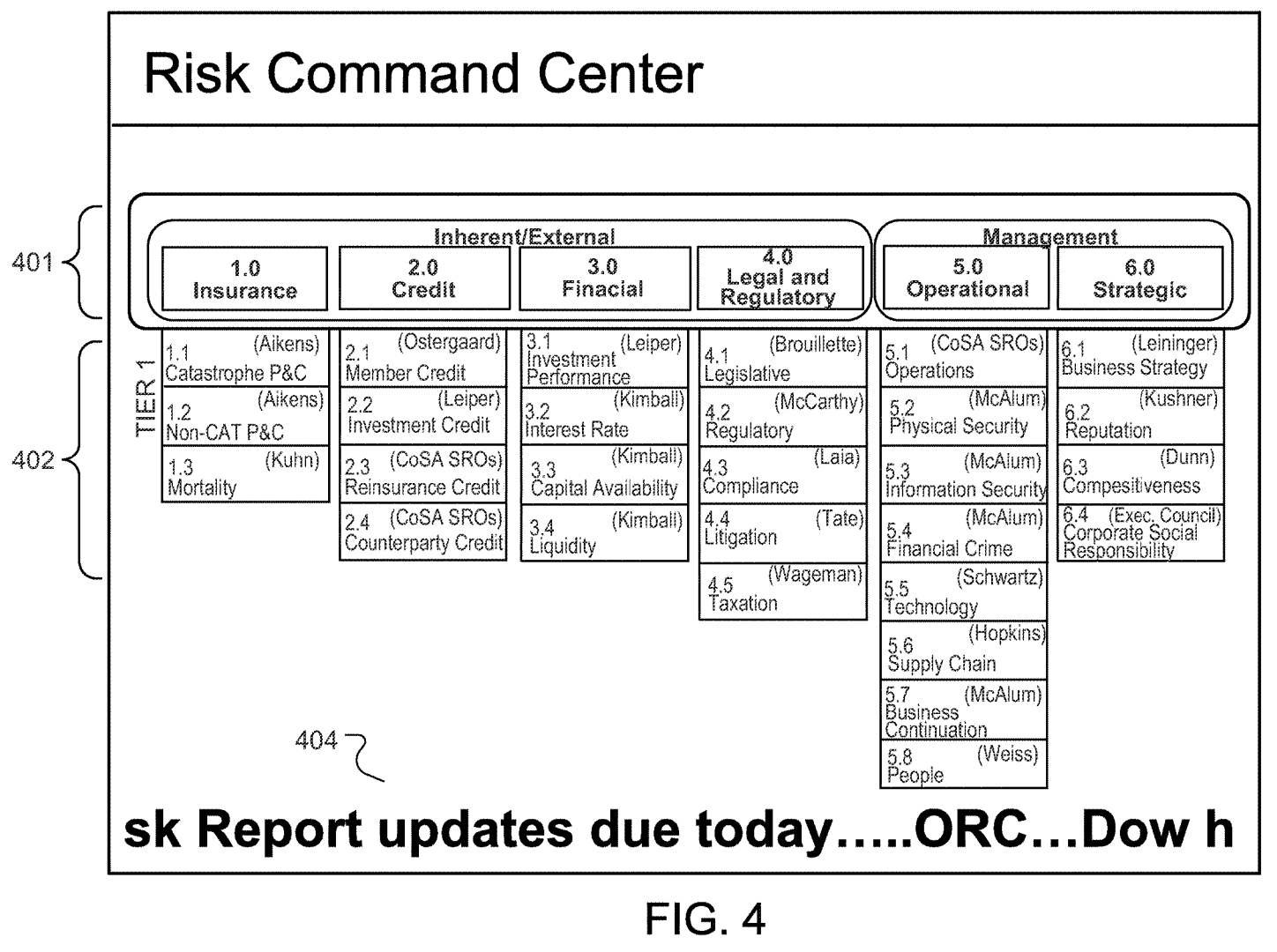

Risk Command Center

401

402

Inherent/External

Management 1.0 Insurance 2.0 Credit 3.0 Finacial 4.0 Legal and Regulatory 5.0 Operational 6.0 Strategic

TIER 1

1.1 Catastrophe P&C (Aikens)

1.2 Non-CAT P&C (Aikens)

1.3 Mortality (Kuhn)

2.1 Member Credit (Ostergaard)

2.2 Investment Credit (Leiper)

2.3 Reinsurance Credit (CoSA SROs)

2.4 Counterparty Credit (CoSA SROs)

3.1 Investment Performance (Leiper)

3.2 Interest Rate (Kimball)

3.3 Capital Availability (Kimball)

3.4 Liquidity (Kimball)

4.1 Legislative (Brouillette)

4.2 Regulatory (McCarthy)

4.3 Compliance (Laia)

4.4 Litigation (Tate)

4.5 Taxation (Wageman)

5.1 Operations (CoSA SROs)

5.2 Physical Security (McAlum)

5.3 Information Security (McAlum)

5.4 Financial Crime (McAlum)

5.5 Technology (Schwartz)

5.6 Supply Chain (Hopkins)

5.7 Business Continuation (McAlum)

5.8 People (Weiss)

6.1 Business Strategy (Leininger)

6.2 Reputation (Kushner)

6.3 Compesitiveness (Dunn)

6.4 Corporate Social Responsibility (Exec. Council)

404 sk Report updates due today.....ORC...Dow h

FIG. 4

ALERT! – 5.5 Technology

500

UDO INCIDENT ON USAA.COM

- Code defect introduced as part of a release to reduce the time for members to view their documents online
- Members were able to see other members' documents
- Timeline:
  - 12:25am - 10:00am members could view other members' documents
  - 10:00am - 2:25pm UDO was taken offline by IT

502

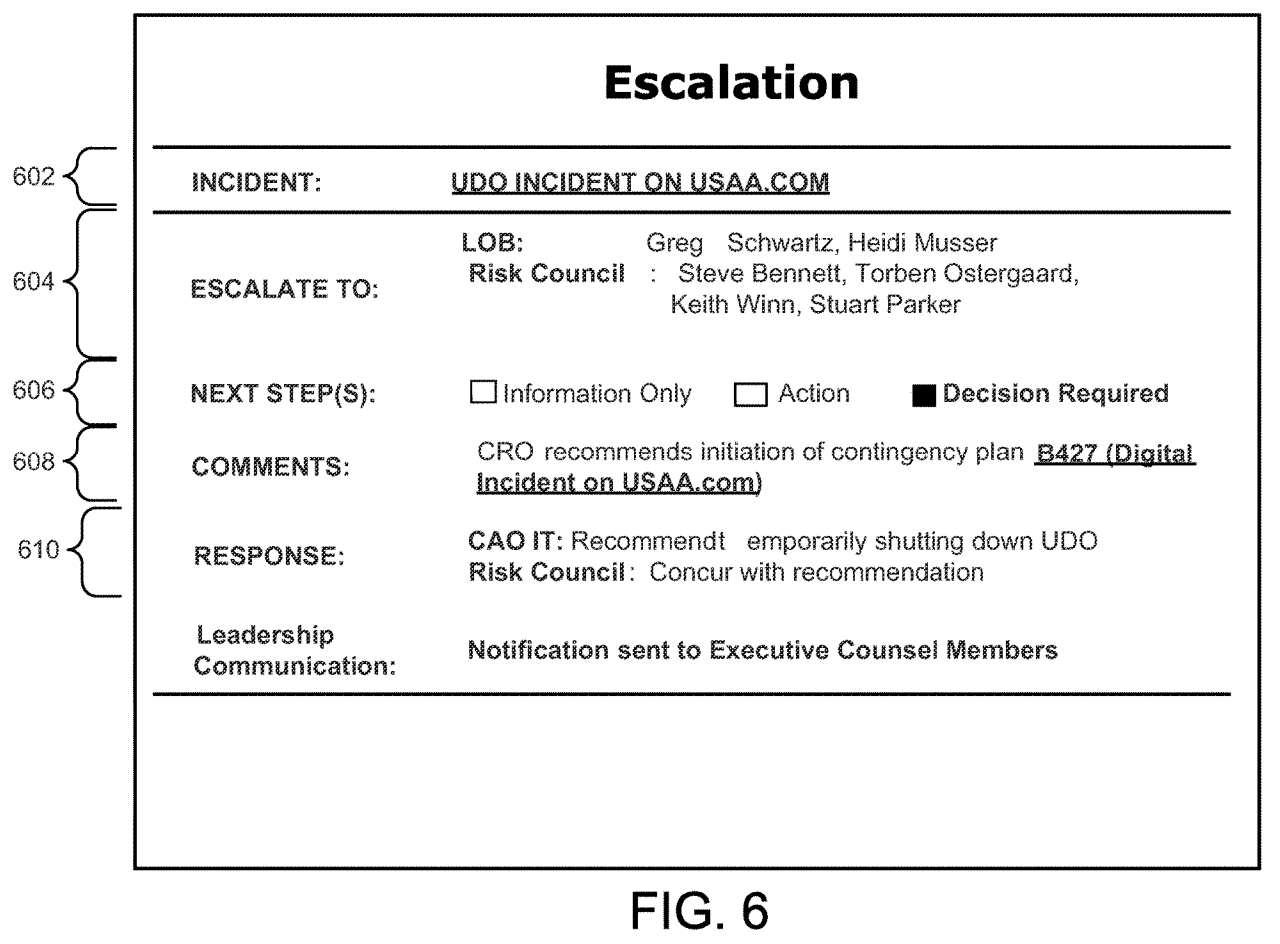

Escalate 602
604
606
608
610

Escalation

INCIDENT: UDO INCIDENT ON USAA.COM

ESCALATE TO:
LOB: Greg Schwartz, Heidi Musser
Risk Council : Steve Bennett, Torben Ostergaard, Keith Winn, Stuart Parker

NEXT STEP(S): ☐ Information Only ☐ Action ■ Decision Required

COMMENTS: CRO recommends initiation of contingency plan B427 (Digital Incident on USAA.com)

RESPONSE:
CAO IT: Recommendt emporarily shutting down UDO
Risk Council: Concur with recommendation

Leadership Communication: Notification sent to Executive Counsel Members

FIG. 6

ALERT! – 3.1 Investment Performance

DOW JONES INDUSTRIAL AVERAGE FELL 630 POINTS, OR 5.5%

- On the first day of trading the since Standard and Poor's downgraded U.S. credit to AA-plus from AAA, the Dow Jones dropped by 630 points, or 5.5%
- Marks the sixth worst single-day point drop in the history of the Dow ALERT! – 5.1 Operations

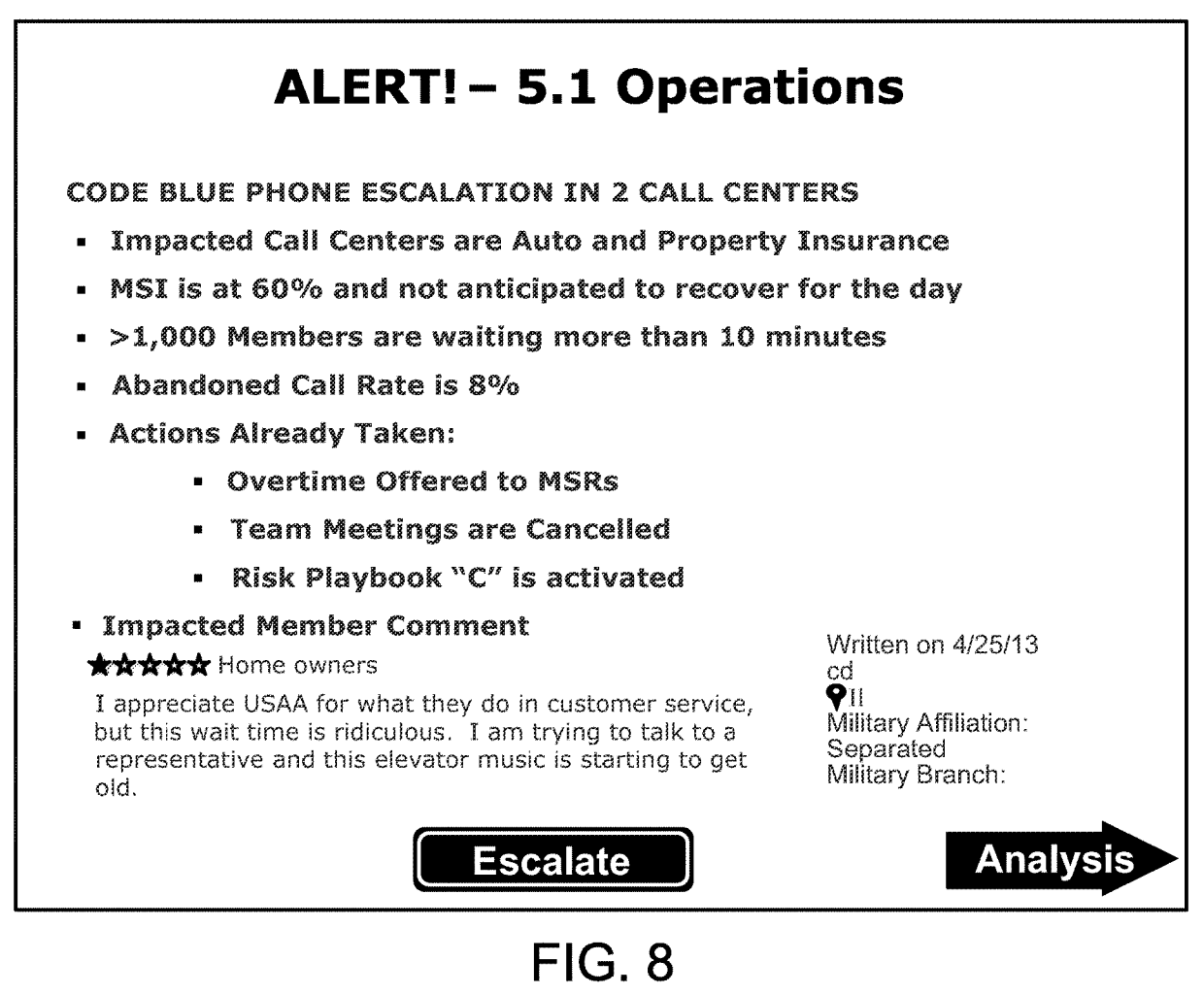

CODE BLUE PHONE ESCALATION IN 2 CALL CENTERS

- Impacted Call Centers are Auto and Property Insurance
- MSI is at 60% and not anticipated to recover for the day
- >1,000 Members are waiting more than 10 minutes
- Abandoned Call Rate is 8%
- Actions Already Taken:
  - Overtime Offered to MSRs
  - Team Meetings are Cancelled
  - Risk Playbook "C" is activated
- Impacted Member Comment ★★★★★ Home owners I appreciate USAA for what they do in customer service, but this wait time is ridiculous. I am trying to talk to a representative and this elevator music is starting to get old.

Written on 4/25/13
cd
Il
Military Affiliation:
Separated
Military Branch:

Escalate

Analysis

FIG. 8

INTEGRATED RISK ANALYSIS MANAGEMENT

TECHNICAL FIELD

The present disclosure relates to integrated risk analysis management.

BACKGROUND

In general, risk management is understood to include the identification, assessment, and/or prioritization of risks to an entity such as a business, as well as the application of resources to address, monitor and/or control the probability or impact of events resulting from those risks. Businesses may face various risks that affect their short term (e.g., day-to-day) or long term objectives, operations, assets and strategies. For businesses with multiple divisions and/or a disperse management hierarchy, the ability to respond to and address risks may be a complex endeavor hindered by limited access to data about risks, as well as slow or incomplete communication of risk information to different parties within the hierarchy and across divisions within the business.

As an example, a business may include multiple different divisions, such as a division devoted to selling and providing insurance coverage, a division devoted to banking and financial services, a division devoted to addressing legal and regulatory issues, a division devoted to accounting, and a division devoted to operational and human resource management issues, among others. According to a typical management hierarchy, each division includes one or more management personnel responsible for addressing risks pertaining to their particular division, with an executive level of management responsible for overseeing the operation and strategy of the business as a whole. In certain cases, risks identified within one particular division, but applicable to other divisions of the business, are not communicated to the other divisions predisposed to the risk. Alternatively, the risks may be communicated too late for preemptive actions to be taken, where such actions can mitigate or adjust for the risk. In some cases, risk information is not communicated across business divisions or to other personnel in a timely manner due to a failure to identify those responsible for addressing the risk. As a result of these and other limitations, businesses may be exposed to unbalanced and unacceptable levels of risk.

SUMMARY

The present disclosure relates to integrated risk analysis management. Systems, devices and methods are presented that allow users to send and receive information about internal and/or external risks to a business entity across multiple divisions and hierarchy levels of the business. Users are provided with dedicated electronic computing devices through which: data about risks can be entered, notifications about risk events, e.g., from other computing devices, can be received, and risks can be identified and escalated to other users. The electronic computing devices also may be configured to analyze the received risk data, apply forecasting models to the received risk data, and generate, output, and communicate forecasting reports based on the applied forecasting models.

A risk includes the likelihood or probability that a situation or event involving a positive or negative effect on an objective, operation, asset or strategy will occur.

In general, in a first aspect, the subject matter of the disclosure may be embodied in a computer-implemented methods that include: receiving, in a first client device, multiple risk indicators from multiple server devices over a network, in which the multiple risk indicators represent different external risks to a business and different internal risks to two or more divisions of the business; applying a forecasting model to at least one of the risk indicators to obtain one or more estimated future performance metrics; outputting to a graphical user interface, at least one of the estimated future performance metrics, the external risks or the internal risks; and outputting to the graphical user interface, a user-interactive feature for sending at least one of the estimated future performance metrics, the external risks, or the internal risks from the first client device, over the network, to a second client device.

Implementations of the method can include one or more of the following features and/or features of other aspects. For example, the methods may further include receiving, at an input to the first client device, at least one user-defined risk indicator and adjusting the forecasting model based on the user-defined risk indicator to obtain the one or more estimated future performance metrics.

In some implementations, the methods further include determining whether any of the risk indicators meet or exceed a corresponding risk threshold and responsive to determining that at least one of the risk indicators meets or exceeds the corresponding risk threshold, outputting to the graphical user interface an alert notification.

In some implementations, the methods further include determining whether any of the estimated future performance metrics meet or exceed a corresponding risk threshold and responsive to determining that at least one of estimated future performance metrics meet or exceed the corresponding risk threshold, outputting to the graphical user interface an alert notification. The methods may further include sending, over the network, the alert notification to the second client device. The methods may further include sending, with the alert notification, a recommended course of action, a request for instructions or a directive to take a specified course of action. Sending the alert notification may include limiting access to the alert notification to one or more individuals.

In some implementations, the methods may further include sending at least one of the estimated future performance metrics, the external risks, or the internal risks from the first client device, over the network, to the second client device.

In some implementations, the external risks correspond to events or quantifiable performance indicators, leading indicators, or trends over which the business has substantially no influence or ability to change, and the internal risks correspond to events or quantifiable performance indicators, leading indicators, or trends over which the business has substantial influence or ability to change.

In another aspect, the subject matter of the disclosure may be embodied in a data processing apparatus that includes a display and a processor including memory, in which the processor is programmed to perform operations including: receiving multiple risk indicators from multiple server devices over a network, in which the multiple risk indicators represent different external risks to a business and different internal risks to two or more divisions of the business; applying a forecasting model to at least one risk indicator to obtain one or more estimated future performance metrics; outputting to the display at least one of the estimated future performance metrics, the external risks or the internal risks;

and outputting to the display, a user-interactive feature for sending at least one of the estimated future performance metrics, the external risks, or the internal risks from the first client device, over the network, to a client device.

Implementations of the data processing apparatus may include one or more of the following features and/or features of other aspects. For example, in some implementations, the processor is programmed to perform operations further including: receiving, at an input to the data processing apparatus, at least one user-defined risk indicator; and adjusting the forecasting model based on the user-defined risk indicator to obtain the one or more estimated future performance metrics.

In some implementations, the processor is programmed to perform operations further including: determining whether any of the risk indicators meet or exceed a corresponding risk threshold; and responsive to determining that at least one of the risk indicators meets or exceeds the corresponding risk threshold, outputting to the display an alert notification.

In some implementations, the processor is programmed to perform operations further including: determining whether any of the estimated future performance metrics meet or exceed a corresponding risk threshold; and responsive to determining that at least one of estimated future performance metrics meet or exceed the corresponding risk threshold, outputting to the display an alert notification. In some implementations, the processor is programmed to perform operations further including sending, over the network, the alert notification to the client devices. In some implementations, the processor is programmed to perform operations further including sending, with the alert notification, a recommended course of action, a request for instructions or a directive to take a specified course of action. Sending the alert notification may include limiting access to the alert notification to one or more individuals.

In some implementations, the processor is programmed to perform operations further including sending at least one of the estimated future performance metrics, the external risks, or the internal risks from the first client device, over the network, to the client device.

In some implementations, the external risks correspond to events or quantifiable performance indicators, leading indicators, or trends over which the business has substantially no influence or ability to change, and the internal risks correspond to events or quantifiable performance indicators, leading indicators, or trends over which the business has substantial influence or ability to change.

Certain implementations may have particular advantages. For example, in some implementations, the methods and systems disclosed herein enable managers and executives of a business to obtain real-time and company-wide views of risk. The methods and systems also may allow for the rapid dissemination of notifications regarding new risks to the business and recommendations to address those risks. In certain implementations, the use of forecasting models allows multiple users across different management areas to obtain forward-looking assessments of risk. In some implementations, the methods and systems also enable real-time identification of personnel responsible for managing and addressing risks.

The details of one or more implementations are set forth in the accompanying drawings and the description below. Other features and advantages will be apparent from the description, the drawings, and the claims.

BRIEF DESCRIPTION OF THE DRAWINGS

FIGS. 4-9 are screen shots illustrating examples of the graphics that the risk management application may output to a graphical user interface of a device.

DETAILED DESCRIPTION

Figure 1:
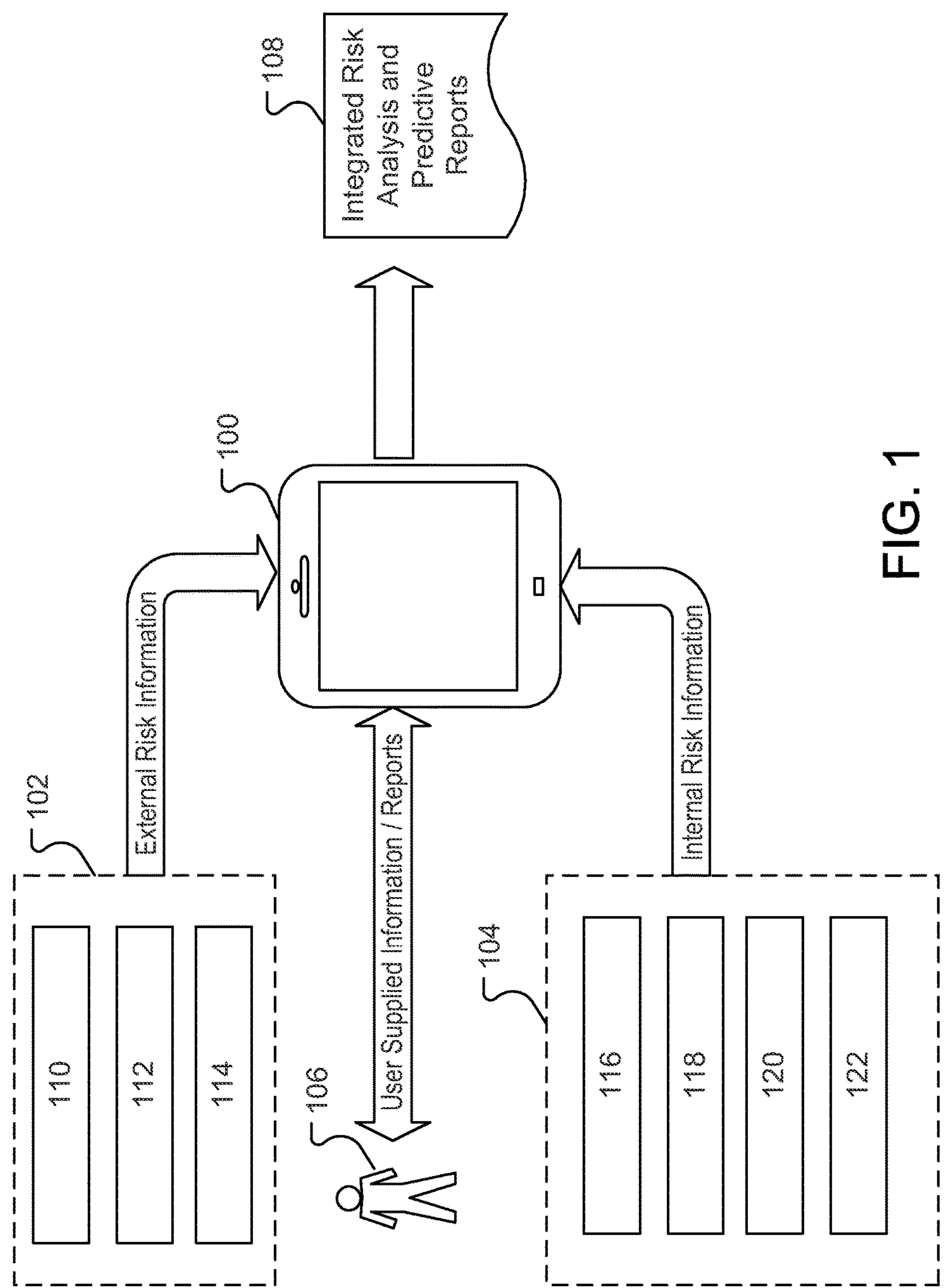
FIG. 1 is a schematic that illustrates an example of an electronic mobile computing device on which a risk-management program is executed.

FIG. 1 is a schematic that illustrates an example of user device 100 that is configured to: receive information about risks to a business, in which the information is in the form of electronic data; analyze the risk data; apply forecasting models to the risk data to generate recommendations for action and forecasting reports about the impact of the risks to certain aspects of the business; and output the risk data and/or the forecasting reports.

User device 100 is an electronic mobile computing device that is under control of a user 106 and that is capable of requesting and receiving data and resources over a network, directly through a user-interface, or through a data port (e.g., flash-drive). A user device 100 may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, an interactive or so-called "smart" television, or a combination of any two or more of these data processing devices or other data processing devices. In some implementations, the user device can be included as part of a motor vehicle (e.g., an automobile, a truck, or a bus). The user device 100 may include a storage device (e.g., memory) on which a user-interactive risk-management program is stored, where the risk-management program causes the device to analyze received risk data and provide the recommendations and/or forecasting reports as set forth below.

The risk information received by the user device 100 may include external risk information and/or internal risk information. External risks include risks that are outside of the substantial control or influence of the business. Examples of external risks include, but are not limited to, risks of natural disasters, risks due to changes in climate and weather, risks due to changes in population health or safety, risks due to changes in demographics, risks of fluctuations and/or uncertainty in financial markets, risks due to levels of national, regional, or local unemployment, risks due to levels of national or regional gross domestic product (GDP), risks from changes in capital and commodity pricing, risks from existing or newly implemented legal regulations, risks from existing or newly implemented tax laws, risks from changes in political climate (e.g., change in partisan make-up of different branches of government or change in governmental form and structure), and risks from externally directed attacks on the business or industry of which the business is a part (e.g., cyberattacks).

Internal risks include risks over which the business has substantial control or influence. For instance, examples of internal risks include, but are not limited to, risks related to hiring decisions, risks related to expansion/contraction of the business operations, risks related to misuse of or damage resulting from assets owned/controlled by the business, risks arising out of the type and quality of technology implemented by the business, risks related to the geographic location of business activities, risks related to changes in growth, production, research and/or development plans, risks related to purchasing decisions, risks arising out of employee satisfaction/dissatisfaction, risks related to legal strategies and decisions, risks due to legal liabilities, risks related to the customers the business agrees to insure, and risks related to tax strategies. The user device 100 may receive the external risk information from one or more sources 102. Examples of sources 102 that may provide the external risk information include financial exchanges 110 (e.g., New York Stock Exchange, NASDAQ, London Stock Exchange Group, or vendors of record affiliated with an exchange such as ACTIV, Reuters, Bloomberg, eSignal, Knight ITCH, and Interactive Data), feed aggregators 112 (e.g., web and news aggregators such as rich site summary (RSS) feeds), and/or government sponsored data sources 114 (e.g., www.data.gov). Other sources for providing external risk information also may be used. The external risk data from sources 102 may be obtained as soon as it is available (e.g., external risk data may be pushed from one or more of the sources 102 out to the user device 100). In addition or alternatively, the external risk data may include historical data that is periodically obtained by the user device 100 (e.g., once a day, once every two days or once every week, once every month), in which the data is pushed out to the user device 100 or where the user device 100 sends a request to the one or more sources 102 for the data. Historical data includes data over specified periods of time such as over the previous day, week, month, or year. Historical data is not limited to historical data from a certain period in the past up to the present time but also may include specified periods of time in the past.

The risk data received from the sources 102 may be in the form of raw data or data that is derived from raw data. Examples of raw data pertaining to external risk information include, but are not limited to, basic market and economic information such as stock market index values (e.g., Dow Jones Industrial Average), national gross domestic product, unemployment rate, treasury rates, new and used auto sale forecasts, used vehicle pricing, commodity pricing, raw material pricing, new housing starts, consumer spending, weather pattern history, weather pattern predictions, charge-off rates (i.e., write-down of bad debt) for an industry in which the business is involved, tax rates to which the business is subject, current cost and/or availability of reinsurance purchased by the business, and demographic information (e.g., age, mortality rates, education, occupation). Examples of data derived from raw data pertaining to external risk information include, but are not limited to, identification of the occurrence and location of natural events/disasters, forecasts based on historical data, analysis of regulations issued by national, state and/or local governments.

The user device 100 may receive the internal risk information from one or more sources 104. Examples of sources 104 that may provide the internal risk information include different divisions across the business, such as an insurance division 116 for selling and providing insurance coverage, a financial products division 118 for providing banking and financial services, a legal division 120 for addressing legal and regulatory issues, and a human resources division 122 for providing operational and human resource management. Other sources for providing internal risk information may also be used.

The internal risk data from sources 104 may be obtained as soon as it is available (e.g., internal risk data may be pushed from one or more of the sources 104 out to the user device 100). In addition or alternatively, the internal risk data may include historical data that is periodically obtained by the user device 100 (e.g., once a day, once every two days or once every week, once every month), in which the data is pushed out to the user device 100 or where the user device 100 sends a request to the one or more sources 104 for the data.

As with external risk information, the internal risk data may include raw data or data derived from the raw data. Examples of raw data pertaining to internal risk information includes, but is not limited to, investment in current and future operations of the business, current and projected demographics (e.g., age, residential location, occupation, education) of customers which the business agrees to insure, rate at which debt is charged-off, funding allotted for litigation involving the business and other legal expenses, investment in labor, projected hiring, investment in technology supporting the business, investment in research and/or development, and/or customer feedback metrics (e.g., metrics rating the popularity of products offered by the business, metrics identifying the number of awards for the business or products developed by the business, metrics identifying customers' perceived value of services and products provided by the business).

In some implementations, the risk information may be provided by the user 106 operating the user device 100. For example, the user 106 may enter the risk information directly through a user-interface or data port. In some instances, the user device 100 may be configured to extract data from reports provided by the user 106 (e.g., using optical character recognition to extract data from a scanned image).

For the purposes of this disclosure, the different risk data (i.e., external or internal risk data) obtained by the user device 100 are referred to as risk indicators. Using the received risk indicators, the device 100 is configured to analyze the risk indicators, and apply forecasting models to the risk indicators to generate recommended courses of action and/or forecasting reports 108 about the impact of the risks to certain aspects of the business. The user device 100 may output the recommendations and/or reports 108 to the user-interface of another user device. In some implementations, the user device 100 may be configured to output the recommendations and/or reports 108 to other electronic computing devices that are similar to the user device 100.

Figure 2:
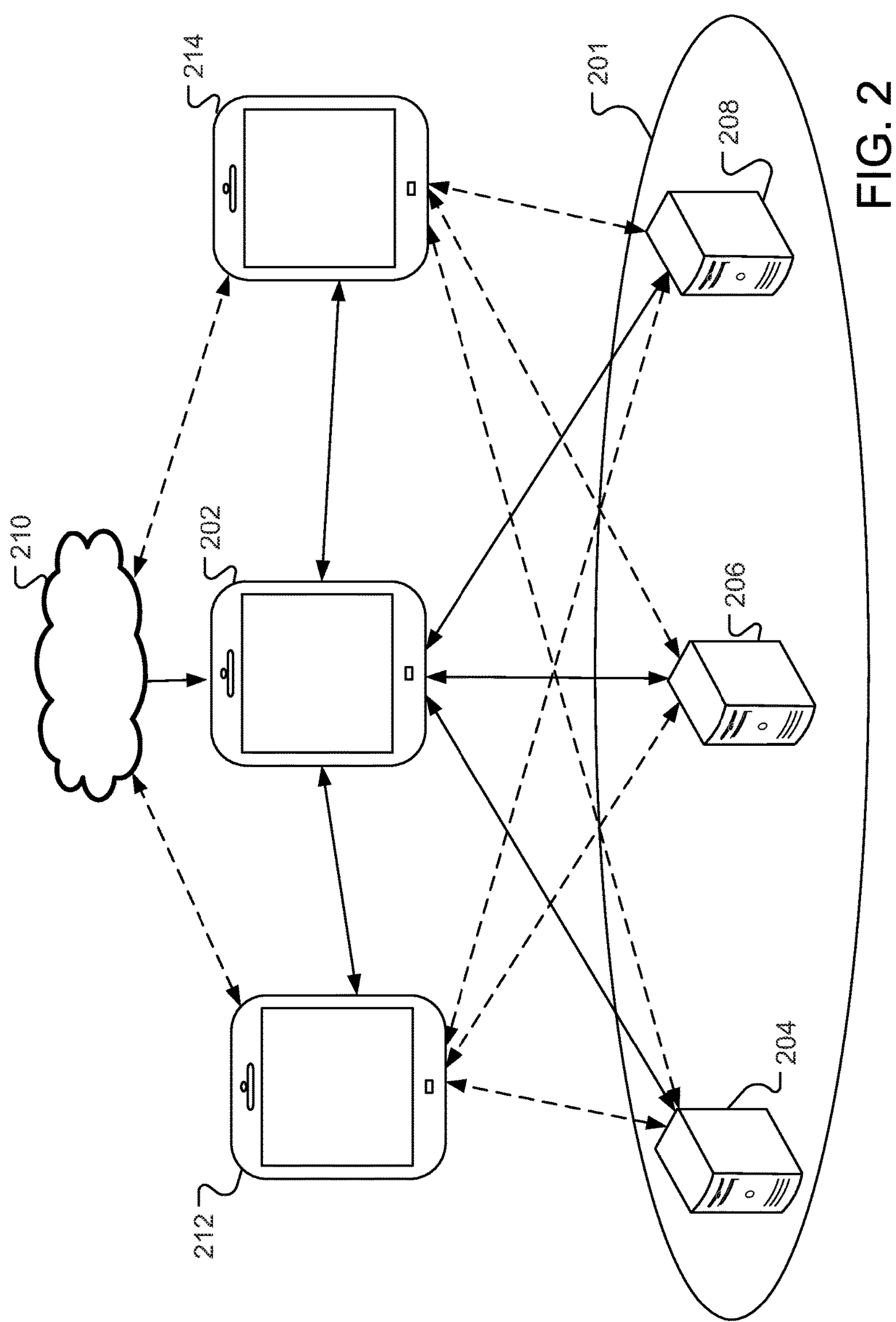
FIG. 2 is a schematic that illustrates an example of communication among an arrangement of user devices on which risk-management programs are executed.

FIG. 2 is a schematic that illustrates communication among an arrangement of user devices 202, 212, 214, in which each of the user devices 202, 212, and 214 is an instance of the user device 100 shown in FIG. 1. Each user device 202, 212, 214 may be controlled/operated by a separate user and may be configured to run an independent risk-management program as detailed herein. Though three user devices are shown in FIG. 2, the total number of user devices may vary. The risk-management program on each user device may be configured for use by a limited number of individuals (e.g., through a user name-password setup). The arrows illustrated in FIG. 2 indicate an example of how data may be transferred to or from a user device. For the purposes of the example shown in FIG. 2, arrows depicting data traffic for user device 202 are shown as solid black, whereas arrows depicting data traffic for devices 212, 214 are shown as dashed lines (the solid lines between device 202 and device 212 encompass data traffic between both those devices and the solid lines between device 202 and device 214 encompass data traffic between both those devices).

Each of the devices 202, 212, 214 may communicate with one or more server devices 204, 206 and 208 controlled and/or operated by the business (indicated by ellipse 201) to obtain risk indicators. For instance, each different division of the business may include one or more server devices that are configured to push risk indicators to one or more of the user devices (202, 212, 214). The risk indicators pushed from the server devices to the user devices may include internal risk indicators particular to the business division in which the server is operated (e.g., internal risk indicators pertaining to the insurance products and services division or internal risk indicators pertaining to the financial and banking products and services division) and/or it may include internal risk indicators that pertain to the operation of the business in general, i.e., not specific to the division in which the server is operated. Alternatively, or in addition, the risk indicators may include external risk data corresponding to external risks to the business. In some implementations, the risk indicator is not pushed out to the user devices and is instead sent in response to a request initiated by one or more of the user devices 202, 212, 214. For instance, a user-device may periodically issue a request for risk indicators from one or more server devices 204, 206 and 208. Alternatively, or in addition, a user operating a user device (202, 212, or 214) may enter a command that causes the user device to issue a request to one or more of the server devices (204, 206, or 208) for risk data. The server devices (204, 206 and 208) and user devices (202, 212, and 214) may be a part of a communication network operated and/or controlled by the business, such as a local area network (LAN) or wide area network (WAN).

Each user device (202, 212, and 214) may also receive risk indicators from one or more other server devices that are not controlled and/or operated by the business. For instance, the user-devices may access one or more servers through network 210. For clarity, the servers accessed through network 210 are not shown. Network 210 may include any digital or analog data communication network, such as the computers and servers that form the Internet. The user devices (202, 212, and 214) may receive risk indicators pushed from the servers. Alternatively, the user devices (202, 212, and 214) may send requests for risk indicators, to which the servers provide the data in response. Examples of servers accessed outside of the business include servers associated with financial exchanges (e.g., DJIA or NASDAQ), web servers (e.g., web servers associated with news feed and news aggregator sites), and/or government operated servers (e.g., servers running www.data.gov).

The user devices (202, 212, and 214) also communicate with each other. Such communication may entail sending an alert notification from one user device to one or more other user devices. For example, in some implementations, a user device 202 may receive risk indicators (e.g., entered by a user operating the user device 202 or from one or more servers in the financial products and services division of the business) identifying an increasing number of malicious attempts to access the business's secure networks by computing systems located outside of the control of the business. The risk management application running on the user device 202 then analyzes this risk indicator (e.g., to determine if the number or severity of attacks exceeds a pre-defined threshold). If the risk management application determines that the risk indicator is severe enough to warrant an alert notification, the application will generate the alert notification and communicate the notification to one or more other user devices (e.g., user devices 212 and 214) through the local network. Alternatively, the risk management application may provide the user with an option to send the notification to one or more user devices. For instance, the risk management application may output a message to a display on the user device 202, in which the message provides the user an interactive option to send the alert notification to other user devices or to decline to send the alert notification.

In some implementations, the risk management application running on the user device 202 may provide the user with an option to select which user devices the alert notification should be sent. For instance, each user device (e.g., 212 and 214) may be associated with a different particular user and the risk management application provides an option to select which user receives the alert notification. Based on which user or users are selected, the user device 202 then may forward the alert notification only to the devices associated with the selected users. As an example, the user of user device 202 may select to send an alert notification regarding the malicious computer attacks only to the chief technical officer (CTO) of the business, so that the alert notification is only sent to the device associated with the CTO.

Similarly, in some implementations, the communication among the user devices (202, 212, 214) entails sending one or more risk forecasting reports from one user to device to one or more other user devices. For example, the risk management application running on the user device 202 may analyze the received risk indicators, apply a forecasting model to the risk indicators to obtain an estimated future performance metric, and generate a forecast report using the estimated future performance metric. In some implementations, the risk management application may automatically communicate the forecast report to other user devices (e.g., user devices 212 and 214) through the local network. Alternatively, the risk management application may provide the user with an option to send the forecast report to one or more user devices. For instance, the risk management application may output a message to a display on the user device 202, in which the message provides the user an interactive option to send the forecast report to other user devices or to decline to send the forecast report.

In some implementations, the risk management application running on the user device 202 may provide the user with an option to select which user devices the forecast report should be sent. As explained above, each user device (e.g., 212 and 214) may be associated with a different particular user. The risk management application provides an option to select which user receives the forecast report. Based on which user or users are selected, the user device 202 then may forward the forecast report only to the devices associated with the selected users.

Figure 3:
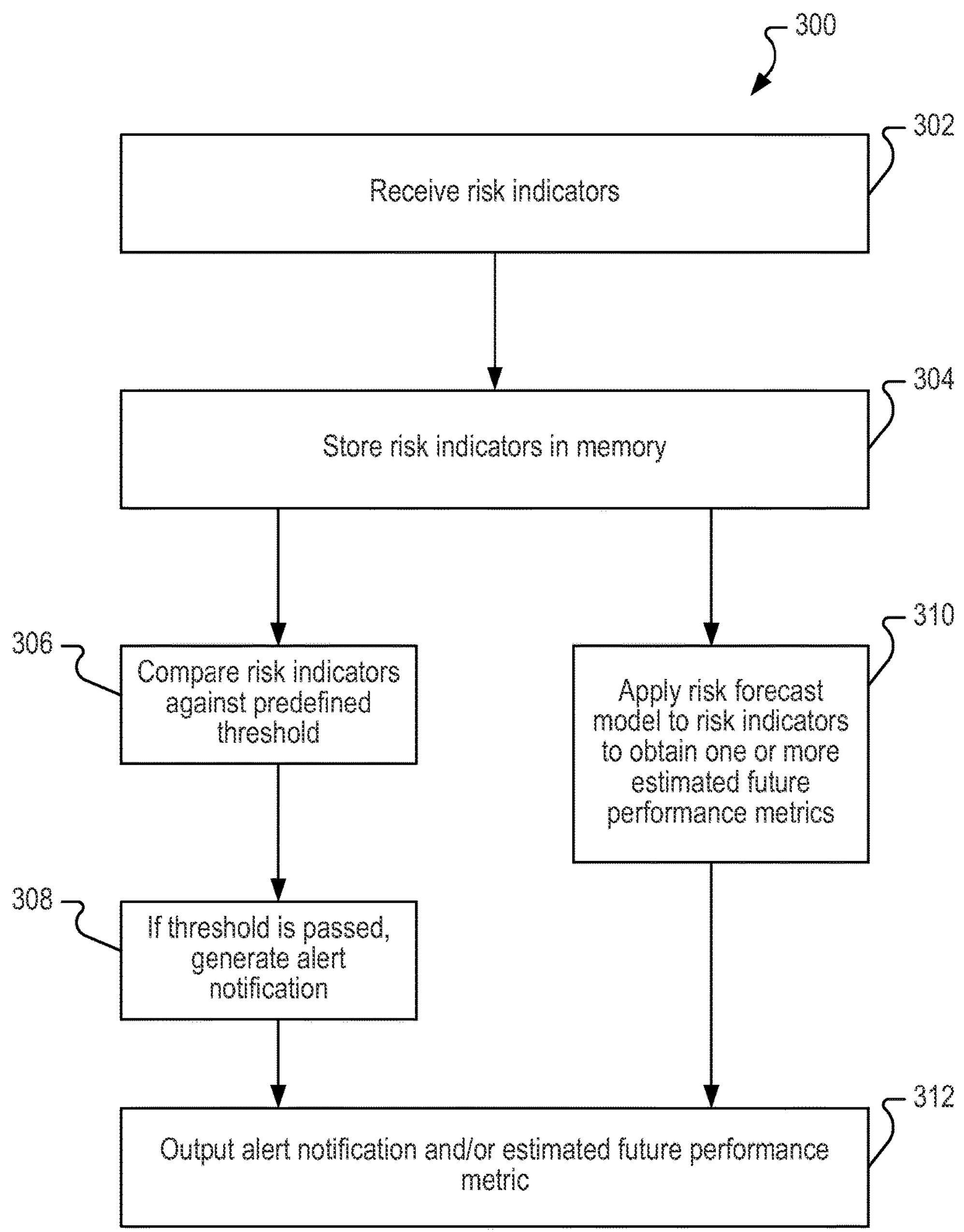
FIG. 3 is a schematic that illustrates an example process performed by a risk management program running on a user device.

FIG. 3 is a schematic that illustrates an example process 300 performed by the risk management application running on a user device (e.g., user device 100 shown in FIG. 1). As explained above, the risk management application running on a user device may receive (302) risk indicators (e.g., internal risk indicators or external risk indicators) from a user, sources internal to the business, or sources external to the business. The risk indicators that are received are then stored (304). For instance, the risk indicators may be stored in a database containing various risk indicators, which may be implemented in memory in the user device or implemented using memory from one or more different computers in a distributed manner (e.g., using "cloud" storage). Subsequent to receipt and storage of the one or more risk indicators, the risk management application may perform at least one of two procedures. In some implementations, the risk management application compares (306) each received risk indicator against one or more predefined risk thresholds. Each predefined risk threshold specifies a limit for a different corresponding risk indicator. Depending on the results of the comparison (i.e., whether the risk indicator is deemed by the risk management application to pass the threshold by exceeding or falling below the specified value, or fail to meet the threshold), the risk management application may generate an alert notification to notify a user that a certain risk threshold has been passed.

Examples of predefined risk thresholds include, but are not limited to, a specific GDP value (e.g., national, regional or state), an unemployment rate (e.g., national or state), a value related to a weather event (e.g., a rainfall, flood, snowfall, or heat index level for a specified geographic region), a commodity price level, a stock market index value, a treasury bond value, a value identifying a number of malicious computer/network related attacks (e.g., for the business in particular or for an industry generally), a level of worker compensation claims, or a defined number of employees, among others. The comparison of the received risk indicators to the predefined risk thresholds includes determining whether the risk indicator equals or exceeds the corresponding threshold or, in some cases, whether the risk indicator falls below the corresponding threshold. For example, in an implementation, the received risk indicator may include an external risk indicator such as a rainfall amount for a specified geographic area over a period of time. The rainfall indicator may be compared against two predefined risk thresholds (e.g., a maximum rainfall amount and a minimum rainfall amount) to determine whether an alert notification should be generated if the rainfall is too high or too low.

In some implementations, the comparison includes a check of a true or false value. For instance, the risk indicator may include a Boolean value representing the occurrence of an event (e.g., fire, flood, or earthquake). The risk management application may then determine that a specified threshold has been passed if the Boolean value matches the value for the risk threshold.

In some implementations, the risk management application may require the identification of a predefined number of instances of the event and/or other risk indicators being reported before triggering the alert notification. For example, the risk management application may require a specified number (e.g., 2, 3, 4, 5 or 6) of external and/or internal sources that include information about the event and/or other risk indicators before an alert notification is triggered. In some implementations, the risk management application may also require additional information about the event and/or other risk indicators before triggering the alert notification. For instance, in some cases, the risk management application may require identification of the geographic location of the event in addition to a specified number of sources reporting the event. If the geographic location where the event occurs matches or is near a predefined location (e.g., any one of a list of geographic locations closely associated with the business, such as a region where a high concentration of the business's customers are located thus leading to a higher than average risk of adverse impact to the business), then the risk management application may trigger the alert notification. The risk management application may also rely on other information about the event and/or other risk indicators, such as specified keywords and/or dates associated with the event and/or the other risk indicators.

In some implementations, the alert notifications are not based only on a comparison of the risk indicator to a threshold, but include a calculation of a new value based, at least in part, on the risk indicator. For example, the received risk indicators may include one or more credit and financial related inputs (e.g., unemployment rate, current delinquency rates, and/or bank reserve levels). The risk management application may process the received credit and financial inputs to determine an estimated charge-off rate (i.e., debt write-off) for the business. The newly derived charge-off rate may then be compared to a pre-defined threshold charge-off value to determine whether or not the estimated value passes the threshold.

The predefined risk thresholds may be set by the user operating the risk management application. Alternatively, the predefined risk thresholds may be embedded in the software underlying the risk management application or set by a user with authorization (e.g., an administrator).

If the risk management application determines that the risk indicator has passed the threshold, the risk management application generates (308) an alert notification. The alert notification may include a message stating the risk indicator has passed the threshold as well as the value of the risk indicator. Alternatively, in some implementations, the alert notification includes a statement detailing the event that occurred in addition to or in place of the risk indicator value. The message may be in the form of a graphic illustration, text, a video message, and/or an audio message.

In some implementations, the alert notification may include a recommended course of action for responding to the identified risk. For instance, in the example where an estimated charge-off rate is compared to a predefined charge-off rate and the estimate is deemed to pass the threshold, the alert notification may include a recommend course of action that would result in a change in the estimated charge-off rate (e.g., a recommendation to expand into lower credit segments or reduce credit extensions). Even if a comparison of a risk indicator to one or more pre-defined risk thresholds does not indicate that the threshold has been passed, the risk management application may still generate a recommended course of action as part of an alert notification or separately from an alert notification. Alternatively, if the threshold is not passed, the risk management application may take no action.

Alternatively, or in addition to comparing the risk indicator to a predefined threshold, the risk management application may apply (310) a risk forecast model to the one or more received risk indicators to obtain one or more estimated future performance metrics relevant that are relevant to the business. The estimated future performance metrics include values that are estimates of how different aspects of the business are expected to perform based on the received risk indicators and the forecast model that is applied. Similar to the example set forth above in which the estimated charge-off rate is calculated, the forecast model of the risk management application may process the one or more received risk indicators to determine the one or more estimated future performance metrics.

The forecast model may include one or more algorithms that rely, at least in part, on the received risk indicators as an input data set. The algorithmic models may include predictive models that are configured to determine the probability of an outcome based on the input data set. The algorithmic models may be parametric and/or non-parametric including, for example, a generalized linear model, a least squares model, an artificial neural network, a naïve Bayes model or a machine learning model. Other types of algorithmic models also are possible.

As an example, the risk management application may apply a predictive forecast model to determine the estimated operational productivity of a business. The risk indicators that such a model may rely on include, for instance, current labor costs for the business, current capital costs for the business, sales data (e.g., number of products sold over a specified period, gross and net revenue, marginal income and revenue), customer lifetime value, and/or risk adjusted return on capital. Other risk indicators are also possible. Upon receiving those risk indicators in the user device, the risk management application applies the indicators as inputs to a productivity forecast model, which produces an estimated operational productivity. The forecast model then may compare the estimated operational productivity to a previously defined operational productivity. The previously defined operational productivity may be obtained, for example, from a current business plan that has been uploaded to the device or from another device under the control/operation of the business. If the estimated operational productivity does not match the previously defined operational productivity, the forecast model may generate a recommended course of action so that estimated productivity realigns with the desired operational productivity as defined in the business plan. For example, the recommended course of action may include, but is not limited to, redeploying employees to different aspects of the business based on business needs (e.g., increasing employee presence at a call center during heightened call volume), providing incentives on balance transfers to increase balances, and lowering rates on loans offered to customers if sales goals are low.

The forecasting models may analyze one or more of the received risk indicators to produce various different estimated future performance metrics. Examples of estimated future performance metrics include, but are not limited to, estimated losses or gains for the business (e.g., estimates of insurance policy losses or gains), estimated number of services (e.g., estimates of new insurance policies sold or lost), estimated number of products utilized by customers (e.g., estimated number of new financial products used by customers), estimates of risk adjusted parameters (e.g., estimated risk-adjusted return on capital or estimated risk-adjusted return on equity), estimated internal charge-off rates to the business, estimated net interest margin (i.e., how successful a firm's investment decisions are compared to its debt situations), estimated operational productivity, estimated number of employees, estimated employee engagement (which may be quantified based on, e.g., a Gallup engagement survey or similar tool), estimated operational costs to the business, estimated net promoter scores (i.e., a metric that characterizes customers as promoters, passive, or detractors to gauge the loyalty of a firm's customer relationships), estimated customer feedback metrics (e.g., identifying expected customer feedback as positive, negative or neutral), estimated product popularity metrics, and awards and recognition (e.g., identification of a correlation between the number of new products or the net promoter score with awards. The correlation may also based on awards and new products of the business's competitors).

Using estimated losses or gains in the insurance field as an example, the forecasting model may take as inputs risk indicators corresponding to demographic information about customers (including, for example, residence information), climate information about the areas in which customers are located, and future weather reports to determine an estimated loss from a potential catastrophic weather event.

After the risk management application applies the forecasting model and/or generates an alert notification, the risk management application may output (312) the estimated future performance metric and/or alert notification to the user device. For example, the risk management application may output a graphic, text or video to a graphical user interface on a display of the device. Alternatively or in addition, the application may output to a speaker an audio message. In some implementations, the risk management application will automatically communicate the estimated performance metric and/or alert notification to one or more other user devices that also run a risk management application. For instance, a business may provide each of the managers of different divisions of the business with a user device (e.g., such as device 100) on which the risk management application runs. A user of each device may manually set a list of which devices will receive the alert notification and/or estimated future performance metrics. Alternatively, or in addition, the risk-management application may not allow modifications for certain defined risk categories.

In some implementations, the risk-management application will provide a user with an option to communicate the alert notification and/or estimated performance metric to another device. For example, the risk-management application may output to a graphical user interface an interactive button that allows a user to "escalate" an alert notification or estimated performance metric to one or more other user devices (e.g., such as a user device operated by a user further up in the management hierarchy). Upon selection of the button by a user, the risk management application may communicate the alert notification or estimated performance metric to the one or more user devices. In some cases, the risk management application provides the user with an option to include a recommended course of action when sending the alert notification and/or estimated performance metric. The recommend course of action may be a user-specified course of action (e.g., entered into the user device using a keypad) or may be generated by the risk management application itself. In any of the above implementations, the user device may be configured to send the alert notification, recommendation, and/or estimated performance metric using one or more different communication methods (e.g., by e-mail, by text, or directly between risk-management applications over a local area network).

In some implementations, the risk-management application outputs to a graphical user interface an interactive graphic that allows a user to adjust the input risk indicators of the forecast model and to view how the estimated future performance metrics vary in response to the adjustments. For example, the interactive graphic may include text fields that allow a user to enter values for the risk indicators that are different than the risk indicators received by the risk-management application. Alternatively, or in addition, the interactive graphic may include adjustable graphical controls that allow a user to directly change or manipulate the risk indicator value. For example, the adjustable graphical control may include, but are not limited to, a graphical slider, a graphical knob, a list box, a drop-down list, a radio button, a split button, or a check box. The estimated future performance metrics also may be displayed as graphics simultaneously with the interactive input controls and/or fields. Examples of graphical user interface elements for displaying the estimated future performance metrics include, but are not limited to, simple text and/or numerical values, charts, graphs, and/or counters. In some implementations, the risk management application provides the user with an option to communicate the values obtained using the interactive graphic to one or more other user devices on which the risk management application runs. For example, the risk management application may output to the graphical user interface an interactive button that allows the user to send the results to one or more user devices upon selection of the button.

FIGS. 4-9 are screen shots illustrating examples of the graphics that the risk management application may output to a graphical user interface of a device (e.g., device 100). FIG. 4 is a screen shot illustrating an example of a "Risk Command Center" visible to a user operating the risk management application on, e.g., user device 100. The Risk Command Center provides the user with an overview of the different departments or divisions 401 of a business. The different divisions may be presented as interactive graphical icons (e.g., buttons). For each division, the Risk Command Center may also include a list of the different internal and/or external risk indicators 402 relevant for that division. Again, the different risk indicators may be presented as interactive graphical icons (e.g., buttons). For each risk indicator and/or division, the Risk Command Center may also display a name of the management personnel responsible for the designated area of the business. In some implementations, the graphical representations of the different divisions 401 and/or the risk indicators 402 are user-interactive such that when a user selects the division or risk indicator (e.g., by clicking or swiping), the risk management application opens a new screen that depicts information about the selected division or indicator (e.g., the output of a forecast model, the value(s) of one or more risk indicators).

In some implementations, access to the divisions and/or risk indicators is restricted for certain users. For instance, the risk management application may be configured to only allow executive level management employees to select and access all of the different interactive division and risk indicator buttons, whereas division level employees may be allowed to access only the corresponding graphical icons associated with their division.

In some implementations, the Risk Command Center may be overlaid with a notification 404. The notification 404 may include, e.g., an alert notification, a message from another user (e.g., a recommended course of action), an estimated future performance metric, or a link to additional information. The notification 404 may be a text bar (e.g., a scrolling text bar) or a graphic (e.g., an exclamation point or graphical envelope). The notification 404 may be interactive such that if a user selects the notification (e.g., by clicking or swiping), the risk management application opens a new screen containing the information to which the notification pertains. In some implementations, the notification 404 is displayed to all users of the risk management application whereas in some implementations the notification 404 is displayed only to one or more select users of the risk management application.

Figure 5:
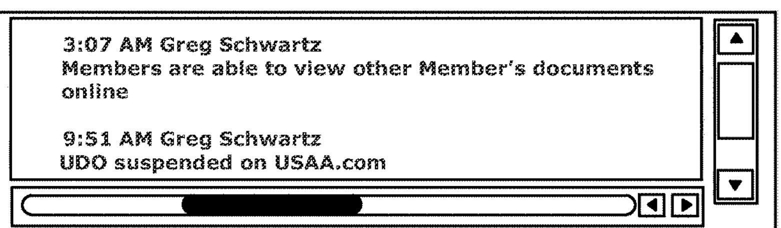

FIG. 5 is a screen shot illustrating an example of an alert notification that may be generated by the risk management application. The alert notification may include a message 500 describing the particular alert and the relevant information pertaining to that alert. The alert notification may be generated based on the risk indicators received by the risk management application or may be generated based on information entered into the risk management application by a user. In some implementations, the alert notification may include an interactive graphical icon 502 that allows a user to communicate the alert notification to one or more other users.

FIG. 6 is a screen shot illustrating an example of an "escalation" screen displayed by the risk management application after a user has selected to escalate an alert notification, e.g., by selecting the graphical icon 502 in the screen shot of FIG. 5, and prior to sending the alert notification out to other users. The escalation screen displays to the user a subject header 602 providing a brief summary of the incident to be communicated, a recipient field 604 identifying the user to whom the alert notification will be sent (the recipient field may be interactive allowing the user to add or remove personnel that will receive the alert notification), a characterization field 606 (e.g., to identify the sensitivity or importance of the alert notification being sent and/or to indicate that further action is needed), a comments field 608 in which a user may enter comments regarding the alert notification, and a response field 610 that may include comments or recommendations from users that may have previously reviewed the alert notification prior to the current user receiving the notification. The fields shown in FIG. 6 are not required and other fields may be included in the escalation screen.

Figure 7:
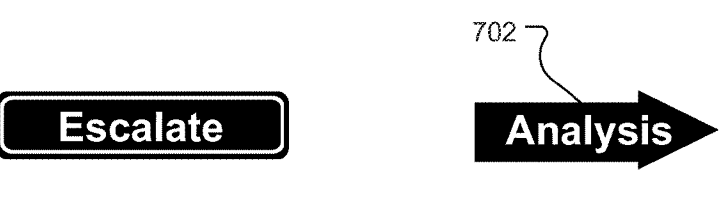

FIG. 7 is a screen shot illustrating an example of another alert notification. A difference between the alert notification shown in FIG. 7 and FIG. 5 is that the notification in FIG. 7 also includes an interactive graphical icon 702 which, upon selection, instructs the risk management application to perform an analysis based on the alert and any risk indicators included in the alert. The analysis may include the application of a forecast model to the risk indicators included in the alert to obtain one or more estimated future performance metrics.

FIG. 8 is a screen shot illustrating an example of another alert notification. As shown in the example alert notification of FIG. 8, the alert notification may include detailed information about a particular event as well as actions taken to address the event that precipitated the alert notification. In the present example, the alert notification provides details about a substantial increase in call volume at call centers for an auto and property insurance division of a business. The information in the alert notification includes risk indicators such as, for example, the number of customers that have waited over a defined period of time to speak to a service representative and the abandoned call rate. The alert notification also includes the specific actions personnel in the business have taken to address the call overflow and provides an example of customer feedback to indicate the severity of the event.

Figure 9:
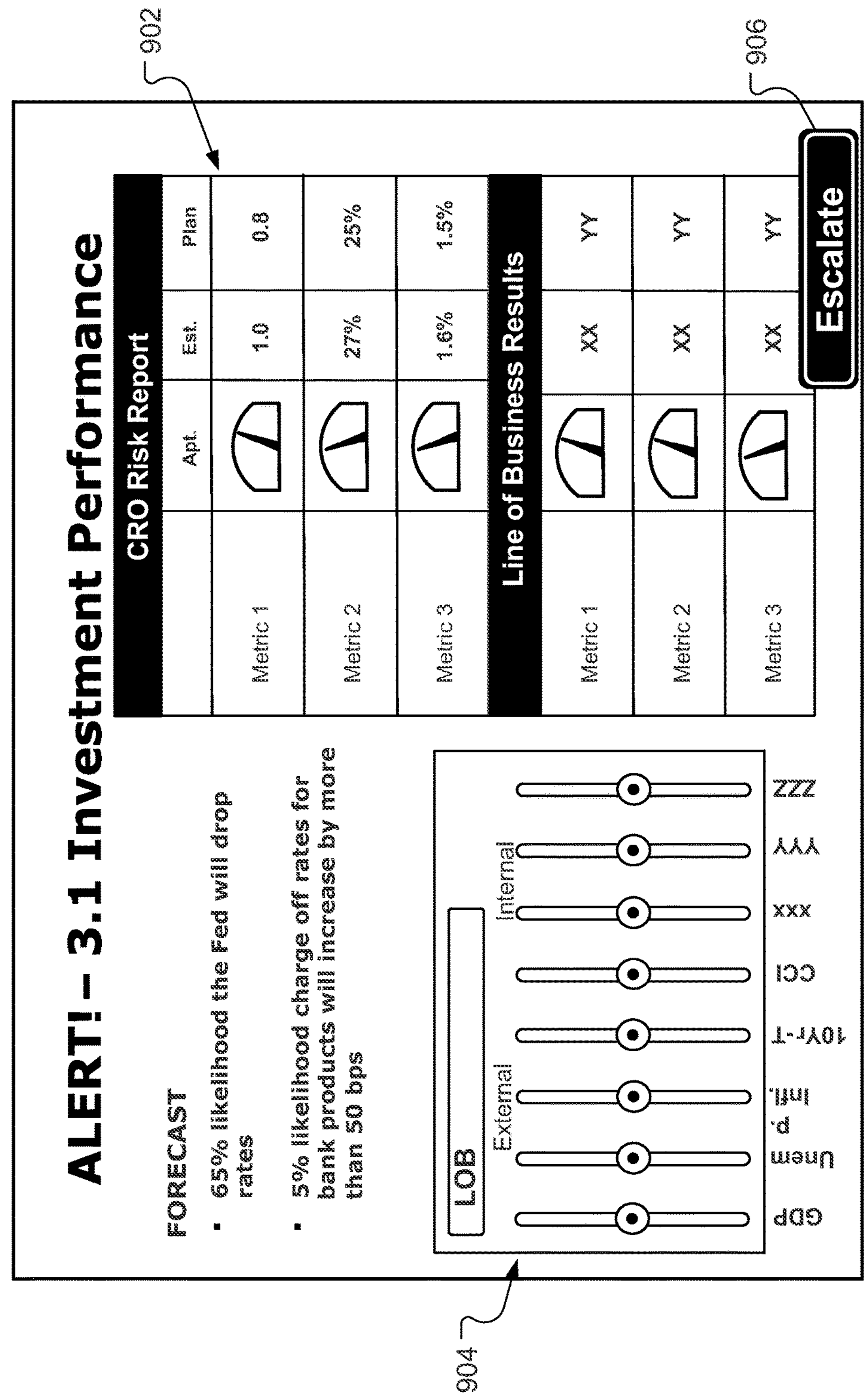

FIG. 9 is a screen shot illustrating an example of an interactive graphic that displays the output of a forecast model applied to multiple risk indicators received by a device running the risk management application (e.g., device 100). The display may include multiple graphical icons 902 illustrating the estimated future performance metrics as well as desired metrics for comparison. The interactive graphic may also include adjustable controls 904 corresponding to the risk indicators applied as inputs to a forecast model. In some implementations, the display may also include messages 906 detailing the estimates and/or including recommendations for action. In some implementations, the display may also include an interactive graphical icon 906 that allows a user to communicate the alert notification to one or more other users.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, application, software, a software application, a software program, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results.

What is claimed is:

1. A computer-implemented method comprising:

receiving data representing a plurality of risk indicators from a plurality of server devices over a network, the plurality of server devices including server devices for a plurality of divisions, wherein the plurality of risk indicators represent different external risks to a business and different internal risks to two or more divisions of the business;

applying a forecasting model to at least one risk indicator to obtain one or more estimated future performance metrics;

determining whether any of the one or more estimated future performance metrics exceed a corresponding risk threshold set by a user of a first client device;

responsive to determining that at least one of the one or more estimated future performance metrics exceeds the corresponding risk threshold, generating an alert notification;

generating data representing a recommended course of action based at least partially on the one or more estimated future performance metrics;

providing, to the first client device, first user interface data that when rendered on a display of the first client device renders one or more graphical representations in a first user interface of the alert notification and one or more selectable icons, selection of which specifies a request to forward the alert notification to one or more second client devices;

receiving, through the first user interface, selection data specifying selection of a given one of the one or more selectable icons;

in response to receiving the selection data, providing, to the first client device, second user interface data that when rendered on the display of the first client device renders a second user interface with an interactive field through which one or more values are input, with the one or more values indicating the one or more second client devices to which the alert notification is transmitted;

receiving, through the second user interface, one or more values input into the interactive field; and sending, over the network, the alert notification and the data representing the recommended course of action to the one or more second client devices specified by the one or more values input into the interactive field.

2. The computer-implemented method of claim 1, further comprising:

receiving, from the first client device, at least one user-defined risk indicator; and adjusting the forecasting model based on the user-defined risk indicator to obtain the one or more estimated future performance metrics.

3. The computer-implemented method of claim 1, further comprising sending, with the alert notification, a request for instructions or a directive to take a specified course of action.

4. The computer-implemented method of claim 1, wherein sending the alert notification comprises limiting access to the alert notification to one or more individuals.

5. The computer-implemented method of claim 1, further comprising:

sending at least one of: the one or more estimated future performance metrics, the external risks, or the internal risks over the network, to the one or more second client devices.

6. The computer-implemented method of claim 1, wherein the external risks correspond to events or quantifiable performance indicators, leading indicators, or trends over which the business has substantially no influence or ability to change, and wherein the internal risks correspond to events or quantifiable performance indicators, leading indicators, or trends over which the business has substantial influence or ability to change.

7. A data processing apparatus comprising:

a display;

a processor including memory and programmed to perform operations comprising:

receiving data representing a plurality of risk indicators from a plurality of server devices over a network, the plurality of server devices including server devices for a plurality of divisions, wherein the plurality of risk indicators represent different external risks to a business and different internal risks to two or more divisions of the business;

applying a forecasting model to at least one risk indicator to obtain one or more estimated future performance metrics;

determining whether any of the one or more estimated future performance metrics exceed a corresponding risk threshold set by a user of a first client device;

responsive to determining that at least one of the one or more estimated future performance metrics exceeds the corresponding risk threshold, generating an alert notification;

generating data representing a recommended course of action based at least partially on the one or more estimated future performance metrics;

providing, to a first client device, first user interface data that when rendered on a display of the first client device renders one or more graphical representations in a first user interface of the alert notification and one or more selectable icons, selection of which specifies a request to forward the alert notification to one or more second client devices;

receiving, through the first user interface, selection data specifying selection of a given one of the one or more selectable icons;

in response to receiving the selection data, providing, to the first client device, second user interface data that when rendered on the display of the first client device renders a second user interface with an interactive field through which one or more values are input, with the one or more values indicating the one or more second client devices to which the alert notification is transmitted;

receiving, through the second user interface, one or more value input into the interactive field; and sending, over the network, the alert notification and the data representing the recommended course of action to the one or more second client devices specified by the one or more values input into the interactive field.

8. The data processing apparatus of claim 7, wherein the processor is programmed to perform operations further comprising:

receiving, at an input to the data processing apparatus, at least one user-defined risk indicator; and adjusting the forecasting model based on the user-defined risk indicator to obtain the one or more estimated future performance metrics.

9. The data processing apparatus of claim 7, wherein the processor is programmed to perform operations further comprising sending, with the alert notification, a request for instructions or a directive to take a specified course of action.

10. The data processing apparatus of claim 7, wherein sending the alert notification comprises limiting access to the alert notification to one or more individuals.

11. The data processing apparatus of claim 7, wherein the processor is programmed to perform operations further comprising:

sending at least one of the estimated future performance metrics, the external risks, or the internal risks over the network, to the client device.

12. The data processing apparatus of claim 7, wherein the external risks correspond to events or quantifiable performance indicators, leading indicators, or trends over which the business has substantially no influence or ability to change, and wherein the internal risks correspond to events or quantifiable performance indicators, leading indicators, or trends over which the business has substantial influence or ability to change.

* * * * *